United States Patent
Kuhrs et al.

(10) Patent No.: US 7,560,496 B2
(45) Date of Patent: Jul. 14, 2009

(54) CATALYTICALLY ACTIVE COMPOSITION FOR THE SELECTIVE METHANATION OF CARBON MONOXIDE AND METHOD FOR PRODUCING SAID COMPOSITION

(75) Inventors: Christian Kuhrs, Heidelberg (DE); Markus Hoelzle, Kirchheim (DE); Till Gerlach, Ludwigshafen (DE); Michael Hesse, Worms (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 37 days.

(21) Appl. No.: 11/814,581

(22) PCT Filed: Jan. 19, 2006

(86) PCT No.: PCT/EP2006/050312

§ 371 (c)(1),
(2), (4) Date: Jul. 24, 2007

(87) PCT Pub. No.: WO2006/077236

PCT Pub. Date: Jul. 27, 2006

(65) Prior Publication Data

US 2008/0139676 A1    Jun. 12, 2008

(30) Foreign Application Priority Data

Jan. 24, 2005    (DE) ................. 10 2005 003 311

(51) Int. Cl.
*C07C 27/00* (2006.01)

(52) U.S. Cl. .................. 518/715; 518/714; 518/719

(58) Field of Classification Search ............ 518/714, 518/715, 719

See application file for complete search history.

(56) References Cited

U.S. PATENT DOCUMENTS

| 3,615,164 A |   | 10/1971 | Baker |
| 3,847,963 A | * | 11/1974 | Lalancette .............. 518/715 |
| 4,465,787 A |   | 8/1984 | Horner et al. |
| 2004/0048114 A1 |   | 3/2004 | Shore |

FOREIGN PATENT DOCUMENTS

| EP | 0946406 | 10/1999 |
| EP | 1 174 486 | 1/2002 |
| EP | 1 246 286 | 10/2002 |
| GB | 1 249 648 | 10/1971 |
| JP | 2002 068707 | 3/2002 |
| JP | 2004 097859 | 4/2004 |
| WO | 97 43207 | 11/1997 |

OTHER PUBLICATIONS

Schay et al (Reaction of carbon monoxide with hydrogen on Ru, Ru-Fe and Fe filem, Journal of Chemical Society, Faraday Transactions, 1982, 78, 1911-1922).*
Chemical Abstracts, vol. 74, No. 35106u, 1971.

* cited by examiner

*Primary Examiner*—Jafar Parsa
(74) *Attorney, Agent, or Firm*—Oblon, Spivak, McClelland, Maier & Neustadt, P.C.

(57) ABSTRACT

The invention relates to a catalytically active composition for the selective methanation of carbon monoxide which comprises at least one element selected from the group consisting of ruthenium, rhodium, nickel and cobalt as active component and a support material based on carbon.

The invention further provides for the use of this catalytically active composition for the selective methanation of carbon monoxide and in the production of hydrogen for fuel cell applications.

13 Claims, 3 Drawing Sheets

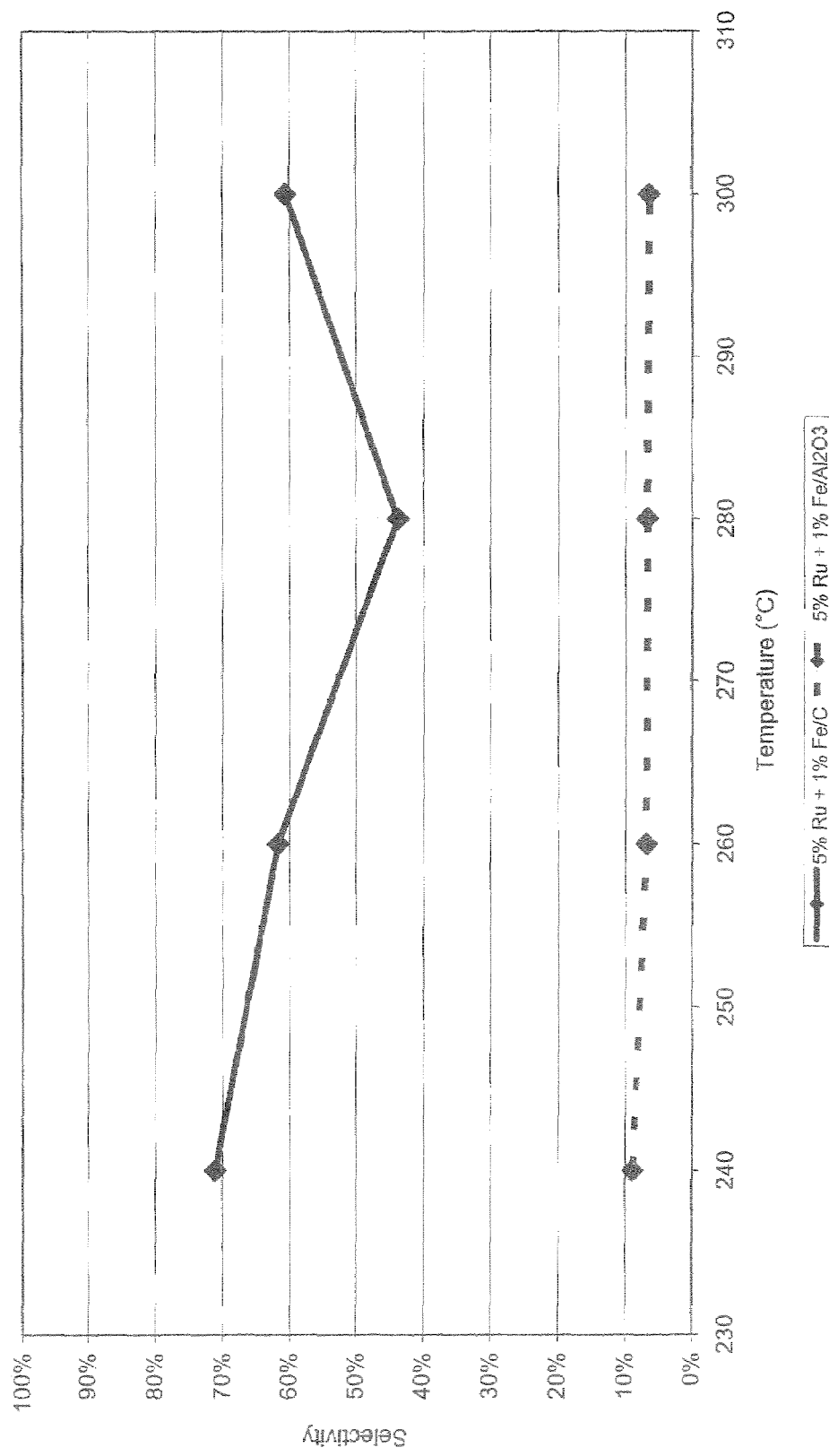
Graph 1

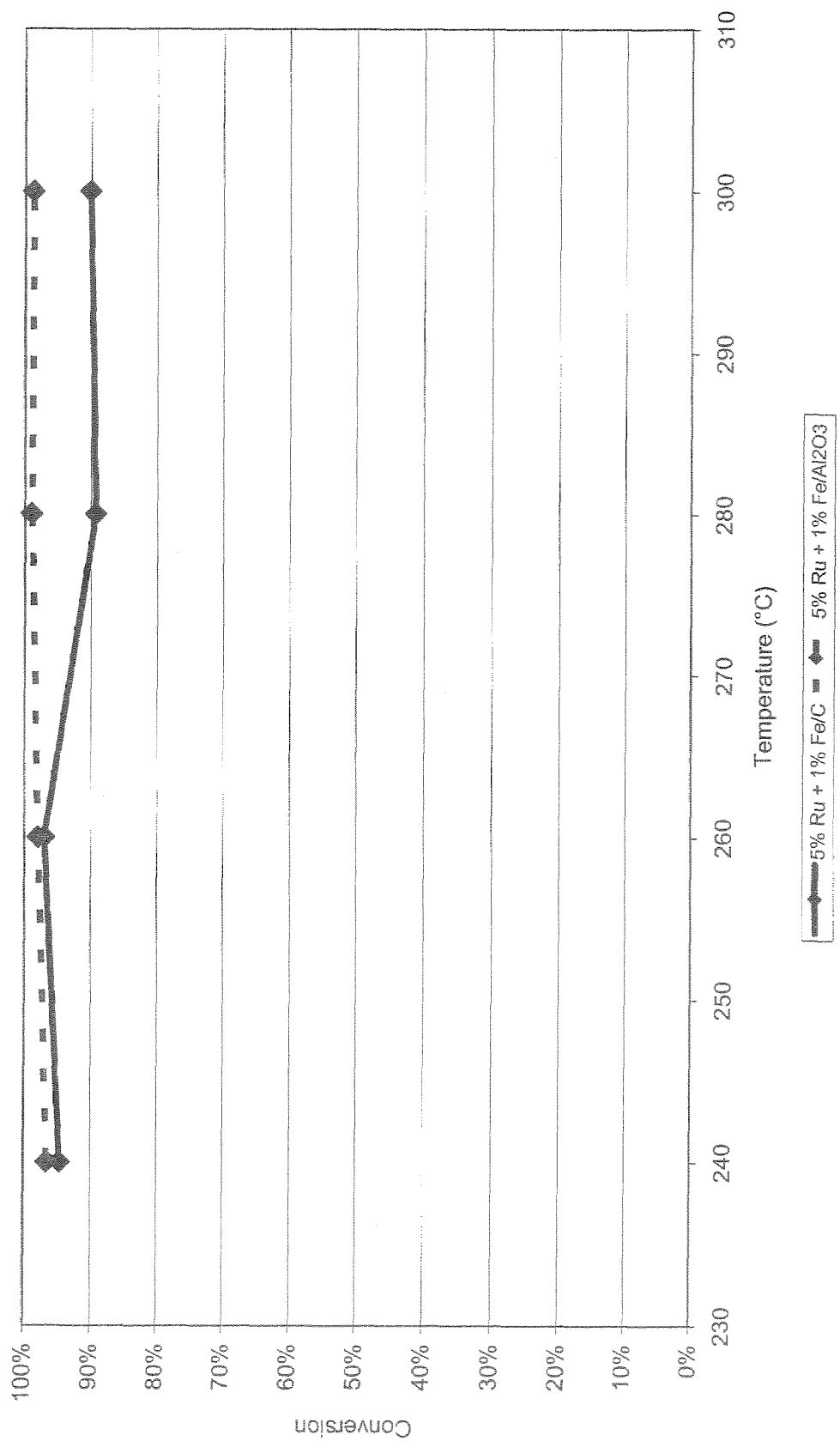

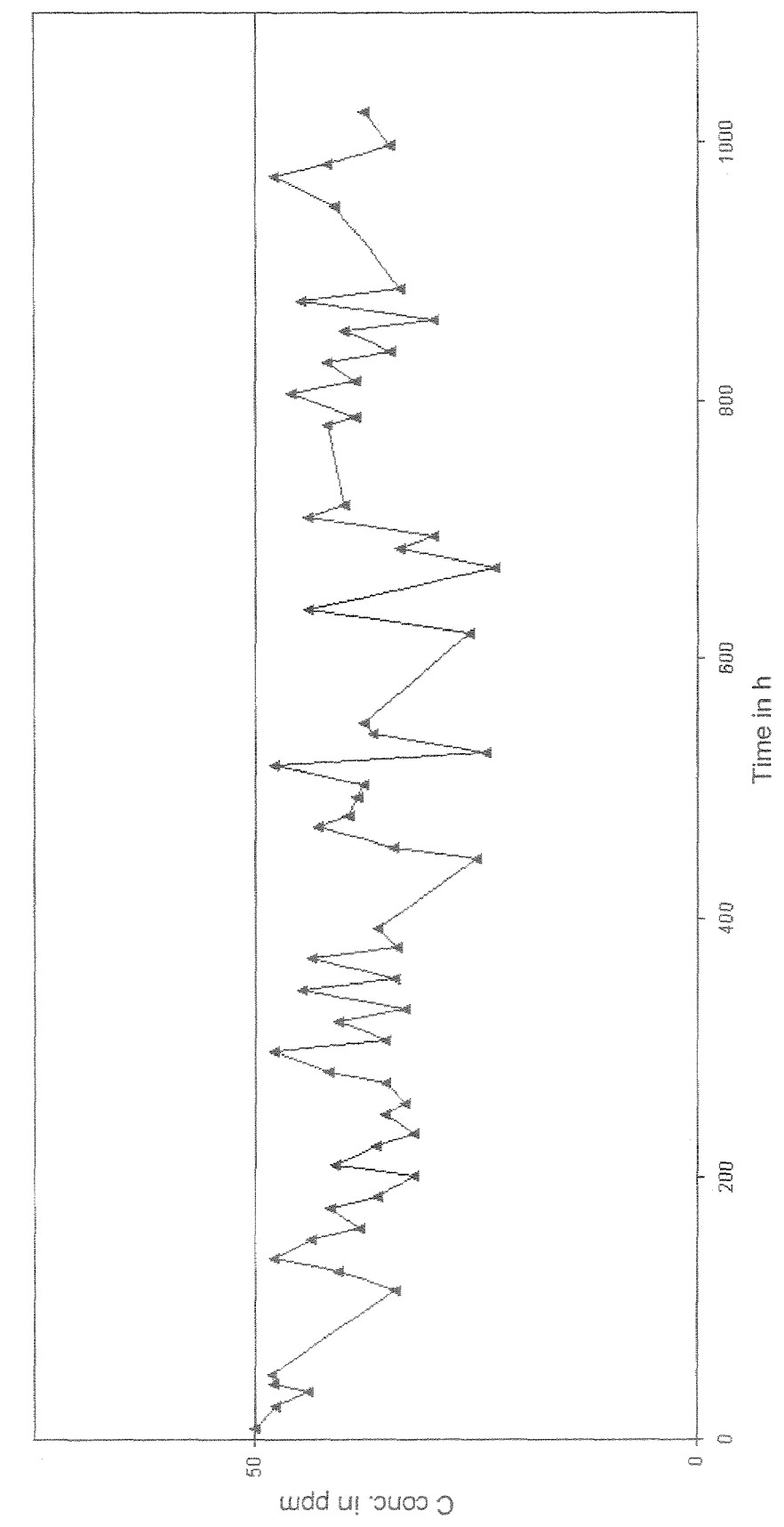

CATALYTICALLY ACTIVE COMPOSITION FOR THE SELECTIVE METHANATION OF CARBON MONOXIDE AND METHOD FOR PRODUCING SAID COMPOSITION

CROSS REFERENCE TO RELATED APPLICATIONS

This application is a 371 of PCT/EP06/050312, filed Jan. 19, 2006, and claims priority to German Application Ser. No. 102005003311.3, filed Jan. 24, 2005.

BACKGROUND OF THE INVENTION

The invention relates to a catalytic composition and a process for the selective methanation of carbon monoxide, in particular for use in fuel cell systems.

Low-temperature fuel cells can only be operated using hydrogen or hydrogen-rich gases of defined quality. The CO concentration depends on the energy carrier employed and on the reforming process used. The removal of relatively high CO concentrations can be effected by means of the shift process with further formation of hydrogen, However, a residual CO concentration, generally in the range from 0.5 to 1.5% by volume, remains, depending on the process design. When Cu catalysts are used, CO removal down to 3000 ppm can, for example, be made possible. The CO content of the hydrogen-rich gas has to be reduced further as far as possible in order to avoid poisoning of the anode catalyst.

The removal of the comprised CO from the gas stream down to below the required limit value is usually carried out in a fine purification step Selective oxidation is nowadays the customary CO removal method. The selective oxidation is highly developed but has the disadvantages of not only moderate selectivity but also the necessity of precisely metered introduction of air, resulting in a high outlay for instrumentation. In addition, mixing the oxidant oxygen into the gas is problematical in terms of safety. The removal of the CO by reaction with $H_2$ (methanation) has considerable advantages over the selective oxidation of CO because it can be realized without any great demands in terms of process engineering.

The methanation of CO (hydrogenation of carbon monoxide to methane) proceeds according to the reaction equation:

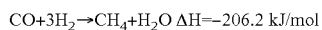

$$CO + 3H_2 \rightarrow CH_4 + H_2O \quad \Delta H = -206.2 \text{ kJ/mol}$$

A competing reaction which occurs is the conversion of $CO_2$ into methane:

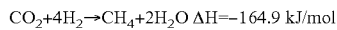

$$CO_2 + 4H_2 \rightarrow CH_4 + 2H_2O \quad \Delta H = -164.9 \text{ kJ/mol}$$

The particular challenge for the selective methanation of CO is that CO should be hydrogenated preferentially and $CO_2$ should not be hydrogenated, since this would consume further hydrogen. Thermodynamically, the methanation of CO is preferred over the methanation of $CO_2$. It is known that methanation of $CO_2$ does not occur below a limit value of 200-300 ppm of CO in the combustion gas. The CO concentration in the combustion gas is about 10 000 ppm, i.e. a factor of 50 higher than the limit indicated.

The $CO_2$ content is from about 15 to 25% by volume and thus an order of magnitude above the CO content. Accordingly, a CO-selective catalyst is indispensable.

The selective methanation of CO has been known for a long time. CO was firstly methanated over an Ni catalyst, but $CO_2$ had to be scrubbed out beforehand. In 1968, a ruthenium catalyst for the selective methanation of CO was claimed by Baker et al. (U.S. Pat. No. 3,615,164) who used a ruthenium or rhodium catalyst on an aluminum oxide support material. Likewise, the selective methanation of CO in a gas mixture comprising hydrogen, carbon dioxide and carbon monoxide at temperatures in the range from 125 to 300° C. using ruthenium-comprising catalysts is described in Chemical Abstracts, Volume 74, 1971, No. 35106u. U.S. Pat. No. 3,663, 162 of 1972 claims a Raney nickel catalyst for this reaction.

In EP-A-1174486, a methanation stage is combined with a unit for selective oxidation with the objective of a lower oxygen consumption and a lower degree of methanation of $CO_2$.

In EP-A-0946406, two methanation stages having different temperature levels are connected to one another. An advantage here is said to be that no or little $CO_2$ is methanated in the high-temperature stage but a large part of the carbon monoxide is reacted in this stage. The removal of the remaining CO occurs in the subsequent low-temperature methanation.

WO 97/43207 describes the combination of a first stage for selective oxidation with a subsequent methanation stage. This combination is said to allow both processes to be operated under optimal conditions.

Further more recent patent applications, for example EP-A-1246286, in which a methanation reactor is preferred over a selective oxidation unit as last process stage of a gas purification for reasons of simpler construction and simpler operability, likewise describe optimized process stages but use conventional catalysts, predominantly catalysts based on ruthenium or nickel.

JP-A-2004097859 describes catalysts for the removal of CO in hydrogen-comprising gas streams by reaction with $H_2$. As catalysts, mention is made of inorganic supports to which one or more metals selected from the group consisting of Ru, Ni and Co have been applied. Support materials are $TiO_2$, $ZrO_2$, $Al_2O_3$ and zeolites.

JP-A-2002068707 relates to a process for removing CO from hydrogen-comprising gas by selective methanation of the CO using a catalyst comprising an Ru component and an alkali metal and/or alkaline earth metal on a heat-resistant inorganic oxide support.

The use of carbon as catalyst support has hitherto not been described for the methanation of carbon monoxide.

The processes of the prior art do not allow a sufficient reduction in the CO content to be obtained while preserving the $CO_2$ content. The catalysts proposed are either not selective enough or work only within a narrow temperature range.

The exothermic nature of the reaction results in hot spots. For this reason, it has to be possible to operate within a wide temperature window. Another problem is the adiabatic temperature increase in monoliths when these are used as shaped catalyst bodies, which is the case in industrial practice.

For fuel cell applications in particular, the required maximum CO content in the hydrogen-rich gas fed in and the necessary high selectivity (methanation of CO but not of $CO_2$) over a wide temperature window still provide a great potential for development of suitable deactivation-resistant catalysts.

BRIEF SUMMARY OF THE INVENTION

The object of the invention is therefore to provide a catalyst for the selective methanation of CO which retains its selectivity and activity over a wide temperature range.

This object is achieved according to the invention by use of a catalytically active composition which comprises ruthenium, rhodium, nickel or cobalt as active component and a support material based on carbon and may, if appropriate, be doped for the selective methanation of carbon monoxide.

The invention accordingly provides a catalytically active composition for the selective methanation of carbon monoxide which comprises at least one element selected from the group consisting of ruthenium, rhodium, nickel and cobalt as active component and a support material based on carbon.

BRIEF DESCRIPTION OF SEVERAL VIEWS OF THE DRAWING

Graph 1: Higher selectivity is achieved in the case of the catalyst according to the invention.

Graph 2: Conversion of the two catalysts.

Graph 3: Development of the CO concentration as a function of time.

The invention further provides for the use of this catalytically active composition for the selective methanation of carbon monoxide and in fuel cell applications.

DETAILED DESCRIPTION OF THE INVENTION

It has surprisingly been found that an Ru-, Rh-, Ni- or Co-comprising catalyst on a carbon support, which catalyst may, if appropriate, be doped with, in particular, Fe, allows the methanation of CO over a wide temperature range from about 100 to 300° C. with virtually constant selectivity over a long period of time. Conventional catalysts display a significant decrease in selectivity with increasing temperature. The use of the catalyst of the invention results in a significantly reduced regulation requirement, since the temperature window in the methanation of the CO has to be adhered to less precisely. In addition, a catalyst which works well even at high temperatures can be installed directly downstream of the prepurification stage (LTC—low-temperature conversion) which is operated at about 220-280° C.

The catalytically active composition comprises at least one element selected from the group consisting of Ru, Rh, Ni and Co, preferably Ru, as active component.

As support material, use is made, according to the invention, of carbon such as activated carbon, acid-activated activated carbon, graphite or pyrolytic carbon, preference is given to using shaped activated carbon bodies.

The loading of the support material with the active component is preferably from 0.1 to 20% by weight, particularly preferably from 1 to 10% by weight.

To increase their activity and/or selectivity, the active component and/or the support material can be doped. Suitable doping elements are, in particular, iron, niobium, manganese, molybdenum and zirconium. Preference is given to doping with iron.

The doping elements are used in an amount of preferably from 0.1 to 20% by weight, particularly preferably from 1 to 10% by weight.

The catalyst of the invention is produced in a conventional way, for example by bringing the active components, preferably in the form of their salts/hydrates, into solution and then applying them in a suitable way, for example by impregnation, to the carbon support. The catalyst is then dried, if appropriate calcined, if appropriate reduced and if appropriate passivated.

This gives a catalytically active composition which is highly suitable for the selective methanation of carbon monoxide. Depending on the respective reaction conditions, the desired significant reduction in the CO content of the gas mixture is achieved.

The selective methanation of CO using this catalytically active composition can advantageously be carried out in a temperature range of preferably from 100 to 300° C.

The catalytically active composition is thus particularly suitable for use in the production of hydrogen for fuel cell applications.

Further embodiments of the present invention are described in the claims, the description and the examples it goes without saying that the abovementioned features and the features still to be explained below of the subject matter of the invention can be used not only in the combination indicated in each case but also in other combinations without going outside the scope of the invention.

The invention is illustrated by the following examples without being restricted thereby.

EXAMPLES

The parameters selectivity and conversion were employed for evaluating the results of the examples. The selectivity is the ratio of the amount of CO reacted to the amount of methane formed (in % by volume). The reported result "c.r." means that $CO_2$ is completely retained. The conversion is based on CO.

Example 1

Preparation of a Catalyst Based on C and Comprising 5% by Weight of Ru and 1% by Weight of Fe, 3 mm Extrudates 4.4 g of ruthenium(III) chloride hydrate were dissolved in 15.0 ml of deionized water and 2.4 g of iron(III) chloride hydrate were dissolved in 10.0 ml of deionized water. The solutions were combined and diluted with deionized water to 90% of the water uptake of the activated carbon support, which in this case was 0.95 $cm^3/g$ (total volume: 41.0 ml).

Activated carbon extrudates having a diameter of 3 mm and a length of about 2-5 mm were placed in a vessel and impregnated dropwise with the solution prepared above. Support and impregnation solution were well mixed during the entire impregnation procedure.

The catalyst was subsequently dried at 90° C. under a stream of 150 l/h of nitrogen in a rotary tube furnace for six hours. Immediately after drying the catalyst was reduced by means of a stream of 15 l/h of hydrogen and 60 l/h of nitrogen in the rotary tube furnace. Here, the furnace was heated to 500° C. over a period of two hours and then maintained at 500° C. for three hours. The catalyst was then cooled to room temperature under nitrogen. Gradually more air and less nitrogen were fed in over a period of two hours, thereby passivating the catalyst. The temperature of the catalyst here was not more than 15° C. above room temperature. For the activity test described under 2 a), the catalyst was broken up to give 1-2 mm crushed material.

Examples 2a) and b)

Selective Methanation

2a) An electrically heated tube reactor having a volume of 50 ml and a diameter of 14 mm was used for the experiment, 4 ml of steatite spheres having a diameter of 1.8-2.2 mm were first installed, and the catalyst mixture was subsequently placed on top of these. The catalyst mixture comprised 10 g of catalyst (as 1-2 mm crushed material), which in the case of the catalyst described in example 1 corresponds to a volume of about 21 ml, which had been well mixed with about 10 ml of steatite spheres having a diameter of 1.8-2.2 mm. 14 ml of steatite spheres having a diameter of 1.8-2.2 mm served as pre-bed and filled the remaining volume of the reactor.

The catalyst was firstly reduced by means of 90 l/h of nitrogen and 10 l/h of hydrogen at 230° C. for one hour. The gas composition selected for the experiment is typical of the output from the low-temperature shift stage after the reforming of methane; 33% by volume of $H_2$; 28% by volume of $N_2$; 25% by volume of $H_2O$; 13% by volume of $CO_2$; 0.5% by volume of CO; 0.5% by volume of $CH_4$. A space velocity of 5 $l \cdot g_{cat}^{-1} \cdot h^{-1}$ was selected.

After all gases had been set and the reactor had (after the reduction at 230° C.) cooled to 150° C., the experiment was started. Every three hours, the temperature was increased by 25° C. over a period of 10 minutes; the maximum temperature was 300° C.

2b) The experiment described under 2a) was repeated using a conventional catalyst based on $Al_2O_3$ and comprising 5% by weight of Ru and 1% by weight of Fe (as 1-2 mm crushed material).

The following results were achieved:

| Selectivity (see also graph 1) | | |
|---|---|---|
| Temperature ° C. | 5% Ru + 1% Fe/C | 5% Ru + 1% Fe/$Al_2O_3$ |
| 240 | 71% | 9% |
| 260 | 62% | 7% |
| 280 | 44% | 7% |
| 300 | 61% | 6% |

| Conversion (see also graph 2) | | |
|---|---|---|
| Temperature ° C. | 5% Ru + 1% Fe/C | 5% Ru + 1% Fe/$Al_2O_3$ |
| 240 | 95% | 97% |
| 260 | 97% | 98% |
| 280 | 89% | 99% |
| 300 | 90% | 99% |

It can clearly be seen from graph 2 that the conversion of the two catalysts is comparable (although it is slightly higher for the conventional catalyst based on $Al_2O_3$). However, graph 1 shows that a significantly higher selectivity is achieved in the case of the catalyst according to the invention. In addition, it can clearly be seen that the catalyst according to the invention offers very good selectivities, particularly at low temperature.

Example 3a)

70 g of 3 mm extrudates Supersorbon SX 30 (from Lurgi) were placed in a vessel and activated with 150 ml of $HNO_3$ (conc.) at 80° C. for five hours. The activated carbon was subsequently washed and dried at 120° C.

7.3 g of ruthenium(III) chloride were dissolved in water and mixed with a solution comprising 2.4 g of iron(III) chloride, diluted with 41 ml of water and slowly added to the activated carbon. The catalyst was dried at 90° C. under nitrogen, and then reduced in a stream of nitrogen/hydrogen at 500° C. After cooling, the material was passivated at room temperature.

Example 3b)

The catalyst described in example 3a) was firstly activated by means of a hydrogen/nitrogen gas mixture in the reactor and then operated at a space velocity of 2.5 $l \cdot g_{cat}^{-1} \cdot h^{-1}$ in a gas stream comprising 33% by volume of $H_2$; 25% by volume of $H_2O$; 28.25% by volume of $N_2$; 13% by volume of $CO_2$; 0.25% by volume of CO; 0.5% by volume of $CH_4$. The temperature was varied in 10K steps in the range from 120 to 220° C. The measurement results on selectivity, conversion and final CO concentration are reported in the following table.

| Temperature [° C.] | Selectivity [%] | Conversion [%] | CO concentration at the reactor outlet [ppm] |
|---|---|---|---|
| 120 | c.r. | 84 | 496 |
| 130 | c.r. | 85 | 473 |
| 140 | c.r. | 87 | 417 |
| 150 | c.r. | 98 | 80 |
| 160 | c.r. | 99 | 43 |
| 170 | c.r. | 99 | 33 |
| 180 | c.r. | 99 | 26 |
| 190 | c.r. | 99 | 38 |
| 200 | 92 | 99 | 39 |
| 210 | 76 | 99 | 33 |
| 220 | 57 | 99 | 41 |

This example clearly shows the very wide temperature window within which the catalyst can be operated.

Example 4

The catalyst according to the invention described in example 1 was operated at a constant temperature of 175° C. at a space velocity of 2.5 $l \cdot g_{cat}^{-1} \cdot h^{-1}$ and the following gas composition (33% by volume of $H_2$; 25% by volume of $H_2O$; 28.25% by volume of $N_2$; 13% by volume of $CO_2$; 0.25% by volume of CO; 0.5% by volume of $CH_4$) for a running time of 1000 h. A CO concentration of <50 ppm was achieved over the running time. $CO_2$ in each case remained unaffected by the reaction over the running time. The concentration of 50 ppm of CO is the limit value for the operation of fuel cells based on polymer electrolyte membranes.

The development of the CO concentration as a function of time can be seen from graph 3.

Subsequent to the experiment, the temperature of the reaction was varied. The results can be seen in the following table:

| Temperature [° C.] | Selectivity [%] | Conversion [%] | Final CO concentration [ppm] |
|---|---|---|---|
| 150 | c.r. | 98.6 | 46 |
| 185 | c.r. | 99.1 | 30 |
| 200 | c.r. | 98.6 | 46 |

The experiment underlines the long-term stability of the catalyst.

Example 5

The catalyst according to the invention described in example 1 was operated in series with a commercial catalyst for low-temperature conversion. A space velocity over the catalyst of 2.5 $l \cdot g_{cat}^{-1} \cdot h^{-1}$ was employed for the selective methanation.

The inlet and outlet values for both reaction stages can be seen from the following table. Example 5a) shows the values for operation of an LTC catalyst at 210° C. 5b) shows those for operation of an LTC catalyst at 220° C.

|  | CO | $CO_2$ | $H_2$ | $N_2$ | $H_2O$ | $CH_4$ |
|---|---|---|---|---|---|---|
| Example 5a) | | | | | | |
| Inlet into LTC | 4% by volume | 8% by volume | 30 Vol % | 28% by volume | 30% by volume | |
| Outlet from LTC 210° C. | 0.25% by volume | 15.75% by volume | 44% by volume | 40% by volume | dry | |
| Outlet from methanation 175° C. | 350 ppm | 15.9% by volume | 43.3% by volume | 40.7% by volume | dry | 0.1% by volume |
| Outlet from methanation 190° C. | 48 ppm | 15.8% by volume | 43.1% by volume | 40.9% by volume | dry | 0.2% by volume |
| Outlet from methanation 200° C. | 45 ppm | 15.7% by volume | 42.8% by volume | 40.9% by volume | dry | 0.3% by volume |
| Outlet from methanation 210° C. | 145 ppm | 15.5% by volume | 42.5% by volume | 41.5% by volume | dry | 0.5% by volume |
| Example 5b) | | | | | | |
| Outlet from LTC 220° C. | 0.18% by volume | 15.8% by volume | 44% by volume | 40% by volume | dry | |
| Outlet from methanation 175° C. | 20 ppm | 15.9% by volume | 43.7% by volume | 40.3% by volume | dry | 0.14% by volume |
| Outlet from methanation 190° C. | 44 ppm | 15.8% by volume | 43.7% by volume | 40.3% by volume | dry | 0.2% by volume |
| Outlet from methanation 200° C. | 46 ppm | 15.8% by volume | 43.4% by volume | 40.6% by volume | dry | 0.3% by volume |
| Outlet from methanation 210° C. | 160 ppm | 15.4% by volume | 42.4% by volume | 41.6% by volume | dry | 0.6% by volume |

Example 6

The catalyst according to the invention described in example 1 was subjected to a series of changes of atmosphere under operating conditions. At a constant reactor temperature of 175° C., the atmosphere was changed from a gas composition 1 (2.5 $l \cdot g_{cat}^{-1} \cdot h^{-1}$, 33% by volume of $H_2$; 25% by volume of $H_2O$; 28.25% by volume of $N_2$; 13% by volume of $CO_2$; 0.25% by volume of CO; 0.5% by volume of $CH_4$) to brief flushing with nitrogen and then to air. After flushing with nitrogen again, the atmosphere was changed back to the original gas composition 1.

This experiment tests the performance of the catalyst during typical start-up and shutdown processes in a PEM fuel cell. The conversion and selectivity values and also the resulting CO concentration after the individual changes of atmosphere are reported in the following table:

| Number of changes | Selectivity | CO conversion | CO conc. |
|---|---|---|---|
| 0 | c.r. | 99% | 22 ppm |
| 2 | c.r. | 99% | 18 ppm |
| 5 | c.r. | 99% | 20 ppm |
| 7 | c.r. | 99% | 32 ppm |
| 9 | c.r. | 99% | 21 ppm |
| 13 | c.r. | 99% | 23 ppm |
| 16 | c.r. | 99% | 23 ppm |
| 18 | c.r. | 99% | 22 ppm |
| 20 | c.r. | 99% | 21 ppm |
| 25 | c.r. | 99% | 23 ppm |
| 27 | c.r. | 99% | 21 ppm |
| 30 | c.r. | 99% | 24 ppm |

It can clearly be seen from this example that the catalyst remains stable despite the changes of atmosphere and in all cases gives a CO concentration significantly below the limit of 50 ppm.

The invention claimed is:

1. A process for methanating carbon monoxide, comprising contacting a catalytically active composition with a gas composition comprising carbon monoxide, carbon dioxide, and $H_2$ to selectively methanate said carbon monoxide in the presence of said carbon dioxide, wherein said catalytically active composition comprises at least one element selected from the group consisting of ruthenium, rhodium, nickel and cobalt as active component, a support material comprising carbon and at least one doping element selected from the group consisting of iron, niobium, manganese, molybdenum and zirconium.

2. The process according to claim 1, wherein said contacting occurs at a temperature in the range from 100 to 300° C.

3. The process according to claim 1, wherein said catalytically active composition comprises ruthenium.

4. The process according to claim 1, wherein said doping element comprises iron.

5. The process according to claim 1, wherein the total loading of the support material with the active component is from 0.1 to 20% by weight.

6. The process according to claim 1, wherein a reactor outlet comprises $CO_2$.

7. The process according to claim 1, wherein the ratio of the methanating of CO to said methanating of $CO_2$ is at least 1:0.75.

8. The process according to claim 1, wherein the ratio of the methanating of CO to said methanating of $CO_2$ is at least 1:0.32.

9. The process according to claim 1, wherein the ratio of the methanating of CO to said methanating of $CO_2$ is at least 1:0.09.

10. The process according to claim 1, wherein said support material comprises at least one selected from the group consisting of activated carbon, acid-activated carbon, graphite, and pyrolytic carbon.

11. The process according to claim 1, wherein said support material comprises a shaped activated carbon body.

12. The process according to claim 1, wherein the total loading of the support material with the active component is from 1 to 10% by weight.

13. The process according to claim 1, wherein said catalytically active composition comprises 5% ruthenium and 1% of an iron/carbon mixture.

* * * * *